United States Patent
Lee et al.

(10) Patent No.: US 9,772,436 B2
(45) Date of Patent: Sep. 26, 2017

(54) HIGHLY DURABLE POLARIZING PLATE AND DISPLAY DEVICE COMPRISING THE SAME

(71) Applicant: Dongwoo Fine-Chem Co., Ltd., Jeollabuk-do (KR)

(72) Inventors: Eun Ok Lee, Cheonan-si (KR); Yun Seong Kim, Pyeongtaek-si (KR)

(73) Assignee: Dongwoo Fine-Chem Co., Ltd. (KR)

( * ) Notice: Subject to any disclaimer, the term of this patent is extended or adjusted under 35 U.S.C. 154(b) by 0 days.

(21) Appl. No.: 15/041,611

(22) Filed: Feb. 11, 2016

(65) Prior Publication Data

US 2016/0231486 A1    Aug. 11, 2016

(30) Foreign Application Priority Data

Feb. 11, 2015   (KR) .......... 10-2015-0020728

(51) Int. Cl.
| | | |
|---|---|---|
| *G02B 27/02* | (2006.01) | |
| *G02B 5/30* | (2006.01) | |
| *G02B 1/14* | (2015.01) | |

(52) U.S. Cl.
CPC ......... *G02B 5/3041* (2013.01); *G02B 5/3083* (2013.01); *G02B 1/14* (2015.01)

(58) Field of Classification Search
CPC ........ G02B 5/3083; G02B 1/04; G02B 5/305; G02B 5/3033; G02B 1/08
USPC ............................ 359/489.07–489.13; 257/40
See application file for complete search history.

(56) References Cited

U.S. PATENT DOCUMENTS

| | | | | |
|---|---|---|---|---|
| 7,965,441 | B2 * | 6/2011 | Chen ............... | B82Y 20/00 359/489.01 |
| 2005/0269020 | A1 * | 12/2005 | Matsuoka ........... | B32B 33/00 156/235 |
| 2007/0036916 | A1 * | 2/2007 | Fujisawa ............ | C08B 3/10 428/1.3 |
| 2007/0243340 | A1 * | 10/2007 | Umemoto ........... | C08F 8/14 428/1.1 |
| 2009/0227756 | A1 * | 9/2009 | Hino ................. | B29C 55/143 526/351 |
| 2011/0212302 | A1 * | 9/2011 | Nitta ................. | B29C 55/06 428/156 |
| 2014/0332786 | A1 * | 11/2014 | Nakazawa ......... | G02B 5/3025 257/40 |

FOREIGN PATENT DOCUMENTS

| | | |
|---|---|---|
| KR | 10-2010-0026928 | 3/2010 |
| KR | 10-2014-0144695 | 12/2014 |
| WO | 2013/173961 A1 | 11/2013 |

* cited by examiner

*Primary Examiner* — Bumsuk Won
*Assistant Examiner* — Tamara Y Washington
(74) *Attorney, Agent, or Firm* — Thomas Engellenner; Reza Mollaaghababa; Pepper Hamilton LLP

(57) ABSTRACT

A highly durable polarizing plate and a display device including the same are provided. In the highly durable polarizing plate, sticking agent having different storage modulus are formed on top and bottom surfaces of a λ/4 retardation film. Such a highly durable polarizing plate can be attached to LCDs and OLEDs to realize high-quality screens due to a small change in retardation value under environments for reliability evaluation of heat resistance and wet-heat resistance.

13 Claims, 1 Drawing Sheet

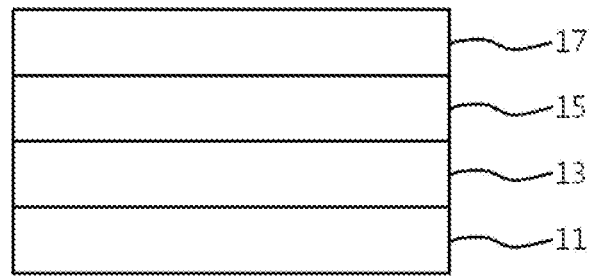

HIGHLY DURABLE POLARIZING PLATE AND DISPLAY DEVICE COMPRISING THE SAME

CROSS-REFERENCE TO RELATED APPLICATION

This application claims priority to and the benefit of Korean Patent Application No. 2015-0020728, filed on Feb. 11, 2015, the disclosure of which is incorporated herein by reference in its entirety.

FIELD OF THE INVENTION

The present invention relates to a highly durable polarizing plate and a display device including the same.

BACKGROUND

A flat-panel display device such as a liquid crystal display (LCD) device, an organic light emitting diode (OLED), etc. includes a number of optical films or optical resin sheets made of a synthetic resin, and thus its applications have also increased.

Unpolarized light emitted from a light source of a flat-panel display device passes through a polarizing plate so that only linearly polarized light is incident on liquid crystal cells. In this case, the intensity of light may be adjusted and gray scales ranging from black to white may be expressed, depending on a degree of rotation of the polarization axis of incident light. That is, the polarizing plate is one of core parts that can visually determine images implemented on the flat-panel display device.

Generally, an LCD includes two polarizing plates, and further includes a retardation film for light compensation, and an OLED includes one polarizing plate having a retardation film installed therein to prevent reflection of light from an external light source.

The polarizing plate is bonded to an LCD and OLED panel by means of a sticking agent. In this case, it is basically desirable that the sticking agent has a smaller change in retardation value upon reliability evaluation of heat shock (H/S) while exhibiting durability characteristics such as heat resistance, wet-heat resistance, etc.

To improve heat resistance and wet-heat resistance associated with the retardation value of the retardation film, there are various attempts to change materials or form a variety of stack structures, etc.

As an attempt to changes materials, Korean Unexamined Patent Application Publication No. 2010-0026928 discloses a retardation film having excellent heat resistance and durability. Here, the retardation film includes a blend resin which includes an acrylic copolymer resin including an alkyl methacrylate-based monomer and an acrylic monomer other than the alkyl methacrylate-based monomer, a resin having an aromatic ring or an aliphatic ring in the polymer main chain thereof, and a copolymer resin including an aromatic vinyl-based monomer and an acid anhydride-based monomer.

International Publication No. WO 2013/173961 discloses a retardation film including a cellulose acylate satisfying an average degree of substitution (DS) of acyl groups ranging from 2.0<DS<2.6, and a certain polycondensation ester or a certain sugar ester. Here, a polarizing plate has excellent durability under wet-heat environments since an interlayer includes a polyvinyl alcohol resin, or an acryl resin containing a polar group.

As a technique of a structural change, Korean Unexamined Patent Application Publication No. 2014-0144695 proposes a retardation film having a multi-layered structure of a retardation layer, an interlayer and a support. Here, the retardation film has excellent durability due to the use of an additional film as the support.

Although the durability or wet-heat resistance characteristics of the retardation film may be improved to some extent using the techniques disclosed in the patents '928 and '961, the retardation film prepared by elongation may be shrunk. Also, in the case of the patent '695, it is impossible to obtain a thin polarizing plate of a polarizer due to inclusion of an additional layer as an interlayer.

PRIOR-ART DOCUMENTS

Patent Documents (Patent Document 1) Korean Unexamined Patent Application Publication No. 2010-0026928
(Patent Document 2) International Publication No. WO 2013/173961
(Patent Document 3) Korean Unexamined Patent Application Publication No. 2014-0144695

SUMMARY OF THE INVENTION

To solve the above problems, the present inventors have conducted a lot of research to improve heat resistance and wet-heat resistance by not controlling materials or structural changes of a retardation film but controlling the physical properties of the retardation film and a sticking agent layer used to bond the retardation film.

Accordingly, the present inventors have prepared a polarizing plate by preparing a retardation film using a liquid crystal coating method to meet the requirements of a thin polarizing plate, and arranging sticking agent layers having different storage moduli on top and bottom surface of the retardation film. As a result, the present inventors have found that the polarizing plate shows excellent heat resistance and wet-heat resistance even under severe conditions without performing an additional pre-treatment or post-treatment process, and thus has a small change in retardation value, compared to polarizing plates including a conventional liquid crystal-coated retardation film. Therefore, the present invention has been completed based on these facts.

Therefore, the present invention is directed to a polarizing plate having high reliability under heat-resistance and wet-heat-resistance environments.

Also, the present invention is directed to a display device including the polarizing plate.

According to an aspect of the present invention, there is provided a highly durable polarizing plate having a stacked structure including a first sticking agent layer, a $\lambda/4$ retardation film, a second sticking agent layer, and a polarizing film from a lower portion thereof.

In this case, the first sticking agent layer may have a storage modulus G1' of $3.5 \times 10^5$ to $7.0 \times 10^5$ Pa, and the second sticking agent layer may have a storage modulus G2' of $1.1 \times 10^6$ to $1.5 \times 10^6$ Pa.

Also, the $\lambda/4$ retardation film may be a $\lambda/4$ retardation film having a liquid crystal coating layer formed by coating.

The $\lambda/4$ retardation film may be an inverse-wavelength dispersible film having a 450 nm/550 nm value of 0.7 to 0.99 with respect to a front retardation value $R_0$.

Also, the λ/4 retardation film may be a flat-wavelength dispersible film having a 450 nm/550 nm value of 0.99 to 1.01 with respect to the front retardation value $R_O$.

In addition, the λ/4 retardation film may be a normal-wavelength dispersible film having a 450 nm/550 nm value of 1.01 to 2 with respect to the front retardation value $R_O$.

In this case, the λ/4 retardation film may have a thickness-direction retardation value $R_{th}$ of 40 to 180 nm.

Also, the λ/4 retardation film may have a front retardation value $R_O$ of 110 to 180 nm.

In addition, the polarizing film may have a stacked structure including a polarizer and a protective film formed on at least one surface of the polarizer.

Further, the polarizing plate may further include a zero retardation film formed to come in contact with at least one layer selected from the group consisting of the first sticking agent layer, the λ/4 retardation film, and the second sticking agent layer.

According to another aspect of the present invention, there is provided a display device including the polarizing plate.

BRIEF DESCRIPTION OF THE DRAWING

The above and other objects, features and advantages of the present invention will become more apparent to those of ordinary skill in the art by describing in detail exemplary embodiments thereof with reference to the accompanying drawing, in which:

FIG. 1 is a cross-sectional view showing a polarizing plate according to one exemplary embodiment of the present invention.

DETAILED DESCRIPTION

Exemplary embodiments of the present invention will be described in detail below with reference to the accompanying drawing. While the present invention is shown and described in connection with exemplary embodiments thereof, it will be apparent to those skilled in the art that various modifications can be made without departing from the scope of the invention.

Unless specifically stated otherwise, all the technical and scientific terms used in this specification have the same meanings as what are generally understood by a person skilled in the related art to which the present invention belongs. In general, the nomenclatures used in this specification and the experimental methods described below are widely known and generally used in the related art.

The present invention provides a highly durable polarizing plate having almost no change in retardation value even under high temperature/humidity conditions using sticking agent layers having different storage modulus in a polarizing plate including a λ/4 retardation film.

The term "highly durable polarizing plate" recited in this application of the present invention refers to a polarizing plate having a small change in the $R_O$ value before/after heat-resistance and wet-heat-resistance tests.

In this case, the heat-resistance test includes conditions at which a polarizing plate is kept for 500 hours in an oven at 85° C., and the wet-heat-resistance test includes conditions at which a polarizing plate is kept for 500 hours under conditions of a temperature of 60° C. and a relative humidity of 90%.

Accordingly, in the present invention, a coatable retardation film having a thickness of several microns, for example, approximately 3 μm is chosen instead of conventional elongated retardation films having a thickness of 20 to 40 μm so as to be applied to thin polarizing plates which satisfy high durability and thus have been actively researched to develop products. The reliability test for the polarizing plate includes a variety of tests. Among theses, there is a heat-resistance and wet-heat-resistance test that is carried out under the severest conditions of high temperature and high temperature/humidity. In these tests, a front retardation value $R_O$ of the polarizing plate is severely reduced. To minimize this reduction, a highly durable polarizing plate having a small change in retardation value even under high temperature/humidity environments using sticking agent having different physical properties is provided in the present invention. Here, the sticking agent are disposed at top and bottom surfaces of the coatable retardation film.

FIG. 1 is a cross-sectional view showing a polarizing plate according to one exemplary embodiment of the present invention.

Referring to FIG. 1, a highly durable polarizing plate 100 has a stacked structure including a λ/4 retardation film 13 and a polarizing film 17. In this case, a first sticking agent layer 11 and a second sticking agent layer 15 are disposed on top and bottom surfaces of the λ/4 retardation film 13.

The λ/4 retardation film 13 is a film coated with a liquid crystal coating composition, and the first and second sticking agent layers 11 and 15 are disposed on the top and bottom surfaces of the λ/4 retardation film 13. In this case, the λ/4 retardation film 13 controls the storage modulus of these layers.

One of parameters representing a dynamic mechanical property among the physical properties of a sticking agent is represented by a storage modulus (G'). In this case, the term "layer having a high storage modulus" refers to a hard-type layer, and the term "layer having a low storage modulus" refers to a soft-type layer. In the present invention, a hard sticking agent is disposed on the λ/4 retardation film disposed at a side of the polarizer, and a soft sticking agent is disposed at a position at which the λ/4 retardation film comes in contact with a panel.

It is desirable that the storage modulus G1' of the first sticking agent layer 11 is smaller than the storage modulus G2' of the second sticking agent layer 15. Therefore, in consideration of the general physical properties required for the sticking agent, the first sticking agent layer 11 is a soft-type sticking agent layer having a storage modulus G1' of $3.5 \times 10^5$ to $7.0 \times 10^5$ Pa, preferably $3.5 \times 10^5$ to $6.7 \times 10^5$ Pa. Also, the second sticking agent layer 15 is a hard-type sticking agent layer having a storage modulus G2' of $1.1 \times 10^6$ to $1.5 \times 10^6$ Pa, preferably $1.2 \times 10^6$ to $1.4 \times 10^6$ Pa.

Within the range of the storage modulus, an effect such as a small change in retardation even under high temperature/humidity environments, which is intended to be achieved in the present invention, may be ensured. When the storage modulus is out of this range, the physical properties of the respective hard-type and soft-type layers may not be expressed. Therefore, the storage modulus is properly adjusted within this range.

Also, the first sticking agent layer 11 is disposed at a bottom side of the polarizing plate 100 to attach the polarizing plate 100 to a liquid crystal or OLED panel. In this case, a sticking agent layer having soft characteristics, that is, the range of storage modulus may be used to achieve a high adhesion to the panel.

Further, the second sticking agent layer 15 is disposed on a surface of the λ/4 retardation film 13 disposed at a side of the polarizing film 17. The shrinkage of the polarizing plate 100 provided with the polarizing film 17 prepared by an elongation process may be somewhat prevented due to the use of the sticking agent layer having the range of storage modulus to exhibit hard physical properties. As a result, an effect of the coatable retardation film on the change in the retardation value may be minimized in an evaluation method such as a heat-resistance and wet-heat-resistance test.

Hereinafter, the respective layers will be described in further detail.

Polarizing Film

The polarizing film 17 has a structure including a polarizer and a protective film formed at least one surface of the polarizer. For example, the polarizing film 17 may have a structure in which a polarizer is disposed between a pair of transparent protective films.

The polarizer is an optical film that converts incident natural light into a desired single polarized state (a linearly polarized state). In this case, any polarizer in which a dichroic dye is adsorbed onto a polyvinyl alcohol-based resin and oriented may be used.

The polyvinyl alcohol-based resin constituting the polarizer may be prepared by saponifying a poly(vinyl acetate)-based resin.

Examples of the poly(vinyl acetate)-based resin may include a copolymer of vinyl acetate with another monomer copolymerizable with the vinyl acetate in addition to the poly(vinyl acetate) that is a homopolymer of vinyl acetate. Specific examples of the another monomer copolymerizable with the vinyl acetate may include unsaturated carboxylic acids, unsaturated sulfonic acids, olefins, vinyl ethers, acrylamides containing ammonium groups, etc. The polyvinyl alcohol-based resin may be modified. For example, polyvinyl formal or polyvinyl acetal modified with an aldehyde may also be used. Generally, the polyvinyl alcohol-based resin has a degree of saponification of approximately 85 to 100 mole %, preferably 98 mole % or more. Also, the polyvinyl alcohol-based resin generally has a degree of polymerization of approximately 1,000 to 10,000, preferably approximately 1,500 to 5,000.

The polarizer may be generally prepared using a process of uniaxially elongating such a polyvinyl alcohol-based resin film, a process of staining an elongated film with a dichroic dye and adsorbing the dye, a process of treating a dye-adsorbed film with an aqueous boric acid solution, and a washing process. In this case, iodine or a dichroic organic dye may be used as the dichroic dye.

The process of uniaxially elongating the polyvinyl alcohol-based film may be performed before or after staining or performed at the same time as the staining. When the uniaxial elongation is performed after the staining, the uniaxial elongation may be performed either before or during the boric acid treatment. Of course, it is possible to perform the uniaxial elongation using a plurality of combinations thereof.

The uniaxial elongation may be performed using rolls having different roll speeds or a row of rolls. In this case, the uniaxial elongation may be a dry elongation in which a film is elongated in the air, or a wet elongation in which a film is elongated in a state in which the film is swelled in a solvent. In this case, the film is generally elongated at an elongation ratio of 3 to 8 times.

The process of staining the elongated polyvinyl alcohol-based film with a dichroic dye may, for example, be performed using a method of immersing the polyvinyl alcohol-based film in an aqueous solution including the dichroic dye. In this case, iodine or a dichroic organic dye is used as a specific example of the dichroic dye. Also, the polyvinyl alcohol-based film may be immersed and swelled in advance before the staining.

In the present invention, the protective film constituting the polarizing film 17 with the polarizer is not particularly limited, and any transparent materials as known in the related art may be used. Typically, a film selected from the group consisting of thermoplastic resins such as a polyester-based resin such as polyethylene terephthalate, polyethylene isophthalate, polyethylene naphthalate, polybutylene terephthalate, etc.; a cellulose-based resin such as diacetyl cellulose, triacetyl cellulose, etc.; a polycarbonate-based resin; an acrylic resin such as polymethyl(meth)acrylate, polyethyl(meth)acrylate, etc.; a styrene-based resin such as polystyrene, an acrylonitrile-styrene copolymer, etc.; a polyolefin-based resin such as polyethylene, polypropylene, a polyolefin having a cyclo-based or norbornene structure, an ethylene-propylene copolymer, etc.; a vinyl chloride-based resin; an amide-based resin such as nylon, an aromatic polyamide, etc.; an imide-based resin; a polyether sulfone-based resin; a sulfone-based resin; a polyether sulfone-based resin; a polyether ether ketone-based resin; a polyphenylene sulfide-based resin; a vinyl alcohol-based resin; a vinylidene chloride-based resin; a vinyl butyral-based resin; an arylate-based resin; a polyoxymethylene-based resin; an epoxy-based resin, etc. may be used as the protective film. In this case, a film formed of a blend of the thermoplastic resins may also be used. Also, a thermosetting or UV-curable resin such as a (meth)acrylic resin, a urethane-based resin, an acrylic urethane-based resin, an epoxy-based resin, a silicon-based resin, etc. may also be used. Preferably, a resin selected from the group consisting of a cycloolefin polymer (COP), a cycloolefin copolymer (COC), a polyethylene terephthalate (PET), a polypropylene (PP), a polycarbonate (PC), a polysulfone (PSF), and a polymethylmethacrylate (PMMA) may be used.

The thickness of the protective film is not particularly limited. In this case, strength and processability may be degraded when the thickness of the protective film is too small, whereas transparency may be degraded or a curing time may be lengthened after stacking of the polarizer when the thickness of the protective film is too large. The thickness of each of the protective films may be in a range of 5 to 200 preferably 10 to 170 and more preferably 20 to 100 μm.

Also, a surface of the polarizer bonded to the protective film may be subjected to a proper surface treatment such as plasma treatment, corona treatment, UV irradiation treatment, flame treatment or saponification treatment to enhance an adhesive property.

In addition, an adhesive is used in the polarizing film 17 to bond the protective film to the polarizer. Examples of the adhesive may, for example, include a solvent-type adhesive, an emulsion-type adhesive, a pressure-sensitive adhesive, an adhesive for dehumidifying purposes, a polycondensable adhesive, a solvent-free adhesive, a film-shaped adhesive, a hot melt-type adhesive, etc. Each of such adhesives is generally used as a water-based adhesive including an aqueous solution, and generally includes a solid content of 0.5 to 60% by weight.

The types of the water-based adhesive are not particularly limited as long as they can be used to sufficiently attach a protective film to a polarizer, have excellent optical transparency and exhibit no change in yellowing in time. Preferably, an isocyanate-based adhesive, a polyvinyl alcohol-based adhesive, a gelatin-based adhesive, a vinyl polymer-based latex adhesive, a water-soluble polyester-based adhesive, a urethane-based adhesive containing a hydrophilic group, and the like may be used. The water-based adhesive may be prepared by mixing such an adhesive component with an additional additive, which is blended as necessary, in water.

Examples of a commercially available polyvinyl alcohol-based resin that may be used as a water-based adhesive may include "KL-318" (trade name) that is a carboxyl group-modified polyvinyl alcohol commercially available from Kuraray Co. Ltd.

The adhesive may be applied to either the polarizer or the protective film, and may also be applied to both of the polarizer and the protective film. After attachment, drying treatment is generally performed to form an adhesive layer including the applied dried layer. In this case, the attachment between the polarizer and the protective film may be performed using a roll laminator. The thickness of the adhesive layer is not particularly limited, but may be generally in a range of approximately 0.1 to 5 μm.

λ/4 Retardation Film

The λ/4 retardation film 13 provided herein has a liquid crystal coating layer formed therein. In this case, the liquid crystal coating layer serves to delay retardation of light passing through a polarizer.

Any formation of the liquid crystal coating layer is possible as long as the liquid crystal coating layer is formed using methods known in the related art, but the present invention is not particularly limited thereto.

Typically, the λ/4 retardation film 13 includes a coating film obtained by applying a liquid crystal coating composition onto an alignment film. The liquid crystal coating composition may include compositions as disclosed in Japanese Patent Laid-Open Publication Nos. 2009-227667, 2009-249526, 2010-024438, 2010-031223, and 2012-118117, but the present invention is not particularly limited thereto.

By way of example, the λ/4 retardation film 13 includes at least one additive selected from the group consisting of a photoinitiator, a polymerization inhibitor, a photosensitizer, a leveling agent, an organic solvent, and a cross-linking agent in addition to the liquid crystal compound presented in Japanese Patent Laid-Open Publication No. 2010-024438.

A compound represented by the following Formula 1 may be used as the liquid crystal compound:

included in E1 and E2 may be substituted with a halogen atom, an alkyl group or halogenated alkyl group having 1 to 4 carbon atoms, an alkoxy group or halogenated alkoxy group having 1 to 4 carbon atoms, a nitrile group, or a nitro group.

In this case, P1 and P2 each independently represent a group represented by Formulas (P-1) to (P-5).

[Formula 2]

(P-1)

(P-2)

(P-3)

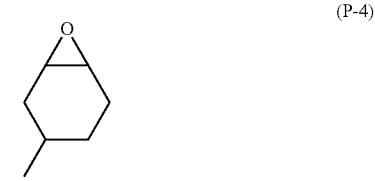
(P-4)

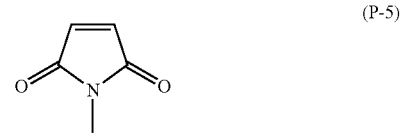
(P-5)

In Formula 2, $R_1$ to $R_5$ each independently represent an alkyl group having 1 to 4 carbon atoms, or a hydrogen atom.

In addition to the liquid crystal compound of Formula 1, the compound that may be used herein may include liquid crystal compounds having a polymerizable group among the compounds described in 3.2 Non-chiral Rod-shaped Liquid

[Formula 1]

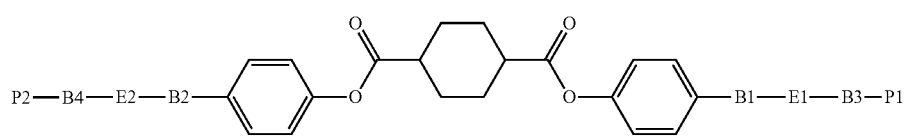

In Formula 1, B1 and B2 each independently represent —O—, —S—, —C(=O)—, —C(=O)—O—, —O—C(=O)—, —C(=O)—NR'—, —NR'—C(=O)—, —OCH$_2$—, or —O—C(=O)—O—, where R' represents an alkyl group having 1 to 4 carbon atoms, or a hydrogen atom, B3 and B4 each independently represent —O—, —C(=O)—, —C(=O)—O—, —O—C(=O)—, —C(=O)—NR'—, —NR'—C(=O)—, —OCH$_2$—, —O—C(=O)—O—, or a single bond, where R' represents an alkyl group having 1 to 4 carbon atoms, or a hydrogen atom, E1 and E2 each independently represent an alkylene group having 1 to 20 carbon atoms and a hydrogen atom Crystal Molecules and 3.3 Chiral Rod-shaped Liquid Crystal Molecules in Chapter 3: Molecular Structure and Crystallinity in the Liquid Crystal Manual (edited by the Liquid Crystal Manual Editing Committee, Maruzen K.K., published on Oct. 30, 2000 (Heisei 12)).

The photoinitiator may, for example, include benzoin, benzophenone, benzyl ketal, α-hydroxy ketone, α-aminoketone, an iodonium salt, or a sulfonium salt, more particularly Irgacure 907, Irgacure 184, Irgacure 651, Irgacure 821, Irgacure 250 and Irgacure 369 (Ciba Specialty Chemicals), SEIKUOL BZ, SEIKUOL Z, SEIKUOL BEE (SECO Chemicals Inc.), Kayacure BP100 (Nippon Chemical Industrial Co. Ltd.), Kayacure-UVI-6992 (DOW), ADEKA Optomer SP-172 or ADEKA Optomer SP-190 (Asahi Denka Corporation), etc.

An amount of such a photoinitiator is used at a content of 0.1 to 30 parts by weight, preferably 0.5 to 10 parts by weight, based on 100 parts by weight of the liquid crystal compound. Within this content range, a liquid crystalline composition may be polymerized without disturbing the alignment of the liquid crystalline composition.

The polymerization inhibitor may, for example, include hydroquinone or a hydroquinone having a substituent such as an alkyl ether, a catechol having a substituent such as an alkyl ether, for example, butylene glycol, a pyrogallol, a radical supplement such as a 2,2,6,6,-tetramethyl-1-pyperidinyloxy radical, a thiophenol, a β-naphthylamine, or a β-naphthol.

The polymerization inhibitor may serve to control polymerization of the liquid crystal compound of Formula 1 and may improve stability of the resulting film and stability of a composition before coating. Such a polymerization inhibitor may be used at a content of 0.1 to 30 parts by weight, preferably 0.5 to 10 parts by weight, based on 100 parts by weight of the liquid crystal compound. Within this content range, the polymerization is possible without disturbing the alignment.

The photosensitizer may include xanthone or a xanthone such as thioxanthone, anthracene or an anthracene having a substituent such as an alkyl ether, phenothiazine, or rubrene.

The polymerization of the liquid crystal compound may be highly sensitized using the photosensitizer. The content of such a photosensitizer may be in a range of 0.1 to 30 parts by weight, preferably 0.5 to 10 parts by weight, based on 100 parts by weight of the liquid crystal compound. Within this content range, the polymerization is possible without disturbing the alignment.

The cross-linking agent may include compounds known in the related art, for example, a polyacrylate, a polymethacrylate, a urethane acrylate, a polyisocyanate, an epoxy compound, an oxetane compound, etc., but the present invention is not limited thereto. More specifically, the cross-linking agent may include triacrylates (Shin Nakamura Chemical Co., Ltd.: CBX-1 N, CBX-0, A-TMPT-3 EO, A-TMPT-6 EO, A-TMPT-9 EO, A-TMM-3, A-TMM-3 L, A-TMM-3 LMN, A-GLY-3 E, A-GLY-6 E, A-GLY-9 E, A-GLY-20 E, and TM-4 EL, SARTOMER com.: SR499, SR502, SR9035, and SR368), tetraacrylates (Shin Nakamura Chemical Co., Ltd.: ATM-4 E, and ATM-35 E), pentaacrylates (Shin Nakamura Chemical Co., Ltd.: A-9530, SARTOMER com.: SR399E), hexaacrylates (Shin Nakamura Chemical Co., Ltd.: A-DPH-6 E, A-DPH-12 E, and A-DPH-6 P, Kyoeisha Chemical Co., Ltd.: UA-306 H, and UA-306 I, Nippon Chemical Industrial Co. Ltd.: DPCA-60, and DPCA-120), etc.

A cross-linking density of an optical film may be adjusted using the cross-linking agent.

The content of the cross-linking agent may be in a range of 0.1 to 30 parts by weight, preferably 0.5 to 10 parts by weight, based on 100 parts by weight of the liquid crystal compound. The liquid crystal compound may be cross-linked by photopolymerization using such a cross-linking agent. Therefore, an effect on a change in birefringence by heat may be reduced.

The leveling agent is used to flatten a film. The leveling agent may include an additive for radiation-curable paints (BIGCHEMI JAPAN: BYK-352, BYK-353, and BYK-361 N), a paint additive (Toray Dow Corning Co., Ltd.: SH28PA, DC11PA, and ST80PA), a paint additive (ShinEtsu Silicones: KP321, KP323, X22-161 A, and KF6001), or a fluorine-based additive (Dainippon Ink and Chemicals, Inc.: F-445, F-470, and F-479).

In a process of preparing the retardation film, the leveling agent may serve to control the fluidity of a composition or the cross-linking density of a retardation film. The content of such a leveling agent may be in a range of 0.1 to 30 parts by weight, preferably 0.5 to 10 parts by weight, based on 100 parts by weight of the liquid crystal compound. Within this content range, a composition constituting the retardation film may be polymerized without disturbing the alignment of the composition.

Any organic solvent may be used as the organic solvent as long as it can be used to dissolve compounds included in the optical film. Specifically, the organic solvent may include an alcohol such as methanol, ethanol, ethylene glycol, isopropyl alcohol, propylene glycol, methyl cellosolve, or butyl cellosolve; an ester-based solvent such as ethyl acetate, butyl acetate, ethylene glycol methyl ether acetate, γ-butyrolactone, or propylene glycol methyl ether acetate; a ketone-based solvent such as acetone, methylethylketone, cyclopentanone, cyclohexanone, methyl amyl ketone, or methyl isobutyl ketone; an aliphatic hydrocarbon solvent such as pentane, hexane, or heptane; an aromatic hydrocarbon solvent such as toluene, xylene, or chlorobenzene; acetonitrile propylene glycol monomethyl ether, tetrahydrofuran, dimethoxyethane, ethyl lactate, chloroform, or phenol. Such an organic solvent may be used alone or in combination. Among these, the alcohol, the ester-based solvent, the ketone-based solvent, the non-chlorine-based aliphatic hydrocarbon solvent, and the non-chlorine-based aromatic hydrocarbon solvent may have excellent compatibility with a composition constituting the retardation film 13, and may be used to dissolve compounds. Thus, such an organic solvent may be used for coating without using a halogenated hydrocarbon such as chloroform.

The viscosity of a coating composition including the above-described composition may be generally adjusted to 10 Pa·s or less, preferably 0.1 to 7 Pa·s so as to promote the coating.

Also, a concentration of solids in a mixture solution is generally in a range of 5 to 50% by weight. When the concentration of the solids is within this range, a film surface of the λ/4 retardation film 13 is not easily stained, and it is easy to adjust the λ/4 retardation film 13 to a proper film thickness, thereby giving optical anisotropy required for optical compensation in various display devices.

Any support base coated with such a liquid crystal coating composition may be used as long as an alignment film may be formed on a surface of the support base.

For example, the support base may include a glass, a plastic sheet, a plastic film, a light-transmitting film, etc. The light-transmitting film may, for example, include a polyolefin film such as polyethylene, polypropylene, or a norbornene-based polymer, a polyvinyl alcohol film, a polyethylene terephthalate film, a polymethacrylic acid ester film, a polyacrylic acid ester film, a cellulose ester film, a polyethylene naphthalate film, a polycarbonate film, a polysulfone film, a polyethersulfone film, a polyether ketone film, a polyphenylene sulfide film, a polyphenylene oxide film, etc.

Since the λ/4 retardation film 13 that may be obtained from the liquid crystal coating composition requires a certain level of strength during handling procedures such as bonding, transportation, storage, etc., the support base may be used for the λ/4 retardation film 13.

A solution of such a liquid crystal coating composition may be directly coated on the support base, or may be coated on an alignment film formed on the support base to realize a more uniform alignment.

The alignment film has resistance to a solvent so that the alignment film is not dissolved due to coating of a solution including the liquid crystal coating composition, has heat resistance due to heating treatment after removal of the solvent and alignment of liquid crystals, needs not to be peeled off by friction such as rubbing, and may be formed from a polymer and a composition optionally including a solvent.

For example, the polymer used to form the alignment film may include polymers, for example, a polyamide or gelatin having an amide bond in a molecule thereof, polyimide and a hydrolysate thereof (i.e., polyamic acid) having an imide bond in a molecule thereof, a polyvinyl alcohol, an alkyl-modified polyvinyl alcohol, polyacrylamide, polyoxazole, polyethyleneimine, polystyrene, polyvinyl pyrrolidone, polyacrylic acid, or polyacrylic acid ester. The polymers may be used alone or in a combination of two or more, or may be copolymerized. In this case, the polymers may be readily obtained using a polymerization method such as polycondensation through dehydration or deamination, chain polymerization (i.e., radical polymerization, anionic polymerization, or cationic polymerization), coordination polymerization, or ring-opening polymerization.

Also, a material for commercially available alignment films may be used intact to form the alignment film. The commercially available alignment films may include alignment films obtained by treating a photosensitive polyimide with polarized UV rays, for example, Saneva (registered trademark: Nissan Chemical Industries, Ltd.), Optimer (registered trademark, JSR), etc., and Pobaru (registered trademark: Kuraray Co. Ltd.) as an alkyl-modified polyvinyl alcohol.

A method of forming the alignment film on the support base may, for example, include a method of applying any solvent on a support base together with the above-described polymer or constituent monomers thereof as the material for commercially available alignment films, followed by annealing the resulting alignment film.

The thickness of the alignment film that may be obtained may be generally in a range of 10 nm to 10,000 nm, preferably 10 nm to 1000 nm.

Also, the alignment film may be subjected to rubbing or polarized UV irradiation, when necessary. As a result, the film formed from the liquid crystal coating composition of the present invention may be aligned in a desired direction.

A method of rubbing the alignment film may, for example, include a method of bringing a rubbing roll, which may rotate to wind a rubbing cloth, into an alignment film returning on a stage.

As described above, there is no need to control a refractive index by elongation since the alignment film may be used to easily realize desired alignments of liquid crystals, for example, homogeneous alignment, homeotropic alignment, hybrid alignment, etc. Therefore, it is possible to prepare the λ/4 retardation film 13 having low in-plane non-uniformity in birefringence and excellent uniformity.

A method of applying the solution of the liquid crystal coating composition on the support base or the alignment film may, for example, include an extrusion coating method, a direct gravure coating method, a reverse gravure coating method, a CAP coating method, a die coating method, etc.

Also, the solution of the liquid crystal coating composition may applied using a coater such as a dip coater, a bar coater, a spin coater, etc.

In the case of photopolymerization, the solvent may be dried off to improve a film forming property. In this case, almost all of the solvent may be dried off prior to the photopolymerization, followed by obtaining an unpolymerized film. Also, in the case of thermal polymerization, a polymerization may be performed while drying off the solvent. However, most of the solvent may be dried off prior to the polymerization, followed by obtaining an unpolymerized film. Thereafter, a polymerization method may include a method capable of exhibiting an excellent film forming property.

A method of drying off the solvent may, for example, include natural drying, air drying, vacuum drying, etc. In this case, a heating temperature may be in a range of approximately 10 to 120° C., preferably approximately 25 to 80° C., and a heating time may be in a range of 10 seconds to 60 minutes, preferably 30 seconds to 30 minutes. Such heating temperature and heating time may be applied to a support base having essentially insufficient heat resistance as the support base.

For the polymerization, the liquid crystal compound may be cured by radiating light such as visible light, ultraviolet light, or laser light as long as a polymerizable functional group included in the liquid crystal compound is a photopolymerizable functional group. When the polymerizable group is thermally polymerizable, the liquid crystal compound may be polymerized by heat.

The λ/4 retardation film 13 of the present invention prepared from the above-described composition may optionally control wavelength dependence of the refractive index of a film, wavelength dispersion characteristics, etc. by varying the content of the liquid crystal compound, and adjust the amount of the composition and the concentration of the organic solvent when the composition is coated. In this case, a retardation value may be controlled by adjusting a film thickness of the film, and stacking of the film may be omitted. Also, the liquid crystal composition may be aligned in the same direction as the film by increasing the content of the liquid crystal compound.

In this case, the retardation value is defined into two parameters: front retardation value $R_0$ and thickness-direction retardation value $R_{th}$, which may be confirmed by definition of the following Equations 1 and 2:

$$R_0 = (nx - ny) \times d \qquad \text{[Equation 1]}$$

$$R_{th} = \left[\frac{nx + ny}{2} - nz\right] \times d \qquad \text{[Equation 2]}$$

In Equations 1 and 2, nx and ny represent an in-plane refractive index of a film, and nz represents a thickness-direction refractive index, $R_0$ represents a front retardation value, and $R_{th}$ represents a thickness-direction retardation value, and d represents a thickness of the film.

That is, the thickness of the film may be increased to increase the retardation value, and the thickness of the film may be decreased to decrease the retardation value.

Preferably, the λ/4 retardation film 13 according to one exemplary embodiment of the present invention has a thickness of 0.1 to 100 preferably 0.1 to 10 and most preferably 0.5 to 3 μm.

For the polarizing plate according to one exemplary embodiment of the present invention, the λ/4 retardation film 13 may have various wavelength dispersion characteristics when necessary. For example, the λ/4 retardation film 13 may have inverse-wavelength dispersion characteristics, flat-wavelength dispersion characteristics, or normal-wavelength dispersion characteristics.

When the λ/4 retardation film 13 according to one exemplary embodiment of the present invention has the inverse-wavelength dispersion characteristics, for example, the λ/4 retardation film 13 may have an $R_0$ (450 nm)/$R_0$ (550 nm) value of 0.7 or more to less than 0.99.

When the λ/4 retardation film 13 according to one exemplary embodiment of the present invention has the flat-wavelength dispersion characteristics, for example, the λ/4 retardation film 13 may have an $R_0$ (450 nm)/$R_0$ (550 nm) value of 0.99 or more to less than 1.01.

When the λ/4 retardation film 13 according to one exemplary embodiment of the present invention has the normal-wavelength dispersion characteristics, for example, the λ/4 retardation film 13 may have an $R_0$ (450 nm)/$R_0$ (550 nm) value of 1.01 to 2.

The polarizing plate according to one exemplary embodiment of the present invention may have a total varying range of a refractive index ratio at which an anti-reflection effect and color feelings of reflected light may be maximized, depending on the wavelength dispersion characteristics of the λ/4 retardation film 13 in the polarizing plate according to one exemplary embodiment of the present invention.

The λ/4 retardation film 13 according to one exemplary embodiment of the present invention may have a wide range of retardation values within a range in which a total of the refractive index of the polarizing plate according to one exemplary embodiment of the present invention is in a range of 0.1 to 0.8. For example, the thickness-direction retardation value $R_{th}$ may be in a range of 40 to 180 nm, and the front retardation value $R_0$ may be in a range of 110 to 180 nm. Within this range, the entire refractive index range may be readily satisfied in the present invention to effectively have the anti-reflection effect. However, this range is merely provided for an illustrative purpose, and thus the λ/4 retardation film 13 may have a different range of retardation values as long as the total range of the refractive index ratio of the polarizing plate is satisfied in the present invention.

Further, the polarizing plate according to one exemplary embodiment of the present invention may further include a zero retardation film in addition to the λ/4 retardation film 13.

The zero retardation film substantially refers to an isotropic protective film where $R_0$=0 nm, and $R_{th}$=0 nm. Such a zero retardation film may be formed to come in contact with the λ/4 retardation film 13 or to come in contact with at least one film selected from the first sticking agent layer 11 and the second sticking agent layer 15.

In this case, when the zero retardation film is further used, the retardation values of the polarizer and the λ/4 retardation film 13 may be used to adjust the total of the refractive index ratio of the polarizing plate in consideration of the retardation value or refractive index of the protective film or the zero retardation film.

Sticking Agent Layer

The first and second sticking agent layers 11 and 15 may have excellent optical transparency and exhibit proper sticking characteristics including wettability, cohesiveness, and an adhesive property. In particular, the first and second sticking agent layers 11 and 15 having excellent durability and the like may be used.

An acrylic, silicon-based, rubber-based, urethane-based, polyester-based or epoxy-based copolymer may be used as a sticking agent suitable for forming the first and second sticking agent layers 11 and 15. Preferably, the sticking agent may be an acrylic copolymer, more preferably an acrylic pressure-sensitive sticking agent. In this case, a composition of the sticking agent may include a known antistatic agent such as an alkali metal salt, an ionic compound, a conductive polymer, a metallic oxide, CNT, etc. Among these, the composition more preferably includes the ionic compound.

The sticking agent composition includes a copolymer containing a cross-linkable functional group, a cross-linking agent, and a silane coupling agent.

The copolymer containing the cross-linkable functional group includes a sticking agent resin. Here, an acrylic, silicone-based, rubber-based, urethane-based, polyester-based or epoxy-based copolymer may be used as the sticking agent resin, preferably an acrylic copolymer.

The acrylic copolymer may be a copolymer of a (meth)acrylic acid ester monomer for preparing a homopolymer having a glass transition temperature of −90 to 10° C. and a monomer containing a cross-linkable functional group. Here, the term "(meth)acryl" refers to both "methacryl" and "acryl."

Specific examples of the (meth)acrylic acid ester monomer for preparing a homopolymer may include n-octyl acrylate, 2-ethylhexyl acrylate, 2-ethylbutyl acrylate, hexyl acrylate, heptyl acrylate, nonyl acrylate, pentyl acrylate, isooctyl acrylate, n-decyl methacrylate, n-dodecyl methacrylate, n-butyl acrylate, isobutyl acrylate, propyl acrylate, ethyl acrylate, methyl acrylate, 3-methyl butyl acrylate, n-hexyl methacrylate, n-octyl methacrylate, n-tetradecyl methacrylate, etc., which may be used alone or in a combination of two or more. Also, the (meth)acrylic acid ester monomer for preparing a homopolymer preferably has a glass transition temperature of −90 to 10° C., more preferably −80 to −10° C.

The (meth)acrylic acid ester monomer for preparing a homopolymer is preferably included at a content of 85 to 99.9% by weight, more preferably 90 to 95% by weight, based on the total content (100% by weight) of the monomers used to prepare the acrylic copolymer. When the content of the (meth)acrylic acid ester monomer is less than 85% by weight, an initial sticking strength and a stress relaxation effect may be poor, whereas sticking durability may be degraded when the content exceeds 99.9% by weight.

The monomer containing a cross-linkable functional group is a monomer that reacts with a cross-linking agent to give cohesion or sticking strength via a chemical bond so that the cohesion of the sticking agent does not collapse under high temperature/humidity conditions. For example, the monomer that may be used herein may include a sulfonic acid group-containing monomer, a phosphoric acid group-containing monomer, a cyano group-containing monomer, a vinyl ester, an aromatic vinyl compound, a carboxyl group-containing monomer, an acid anhydride group-containing monomer, a hydroxyl group-containing monomer, an amide group-containing monomer, an amino group-containing monomer, an imide group-containing monomer, an epoxy group-containing monomer, and an ether group-containing monomer, which may be used alone or in a combination of two or more.

The sulfonic acid group-containing monomer may include styrenesulfonic acid, allyl sulfonic acid, 2-(meth)acrylamido-2-methylpropane sulfonic acid, (meth)acrylamidopropane sulfonic acid, sulfopropyl (meth)acrylate, (meth) acryloyloxy naphthalene sulfonic acid, sodium vinyl sulfonate, etc.

The phosphoric acid group-containing monomer may include 2-hydroxyethyl acryloyl phosphate.

The cyano group-containing monomer may include (meth)acrylonitrile.

The vinyl ester may include vinyl acetate, vinyl propionate, vinyl laurate etc.

The aromatic vinyl compound may include styrene, chlorostyrene, chloromethylstyrene, α-methylstyrene, other substituted styrenes, etc.

The carboxyl group-containing monomer may include (meth)acrylic acid, carboxyethyl (meth)acrylate, carboxypentyl (meth)acrylate, itaconic acid, maleic acid, fumaric acid, crotonic acid, isocrotonic acid, etc.

The acid anhydride group-containing monomer may include anhydrous maleic acid, anhydrous itaconic acid, and an acid anhydride thereof.

The hydroxyl group-containing monomer may include 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth)acrylate, (4-hydroxymethylcyclohexyl) methylacrylate, N-methylol (meth)acrylamide, vinyl alcohol, allyl alcohol, 2-hydroxyethyl vinyl ether, 4-hydroxybutyl vinyl ether, diethylene glycol monovinyl ether, etc.

The amide group-containing monomer may include (meth)acrylamide, diethylacrylamide, N-vinylpyrrolidone, N,N-dimethyl (meth)acrylamide, N,N-diethyl (meth)acrylamide, N,N'-methylenebisacrylamide, N,N-dimethylaminopropyl (meth)acrylamide, diacetone acrylamide, etc.

The amino group-containing monomer may include aminoethyl (meth)acrylate, N,N-dimethylaminoethyl (meth)acrylate, N,N-dimethylaminopropyl (meth)acrylate, (meth)acryloyl morpholine, etc.

The imide group-containing monomer may include cyclohexyl maleimide, isopropylmaleimide, N-cyclohexylmaleimide, itacon imide, etc.

The epoxy group-containing monomer may include glycidyl (meth)acrylate, methylglycidyl (meth)acrylate, allylglycidyl ether, etc.

The ether group-containing monomer may include 2-methoxyethyl (meth)acrylate, 2-ethoxyethyl (meth)acrylate, butoxyethyl (meth)acrylate, phenoxyethyl (meth)acrylate, and acryloyl morpholine.

The monomer containing a cross-linkable functional group may be included at a content of 0.1 to 17% by weight, preferably 1 to 8% by weight, based on the total content (100% by weight) of the monomers used to prepare the acrylic copolymer. When the content of the monomer is less than 0.1% by weight, physical properties such as sticking durability and cuttability may be degraded due to low cohesion of the sticking agent, whereas a residual stress relaxation effect may be relatively lowered when the content of the monomer exceeds 17% by weight.

The acrylic copolymer made of the above-described component may serve to adjust the content of the (meth)acrylic ester monomer for preparing a homopolymer having a glass transition temperature of −90 to 10° C. and the content of the monomer containing a cross-linkable functional group in the copolymer, thereby reinforcing a cohesion to improve sticking durability and cuttability or reversely improving stress relaxation characteristics.

A method of preparing the acrylic copolymer is not particularly limited, and the acrylic copolymer may be prepared using a conventional polymerization method such as solution polymerization, photopolymerization, bulk polymerization, suspension polymerization, or emulsion polymerization, preferably may be prepared using a solution polymerization method. In this case, a polymerization temperature may be in a range of 50 to 110° C., and a polymerization initiator may be added in a state in which the monomers are homogeneously mixed.

The acrylic copolymer may generally have a weight average molecular weight (converted with respect to polystyrene) of 50,000 to 2,000,000, as measured by a gel permeation chromatography (GPC) method.

The cross-linking agent may be used to properly cross-link the acrylic copolymer to reinforce cohesion of the sticking agent composition. Here, an isocyanate compound, an epoxy compound, a melamine-based resin, an aziridine-based compound, and the like may be used. Preferably, an isocyanate compound or an epoxy compound may be used. The types of the cross-linking agent may be used alone or in a combination of two or more.

The isocyanate compound may include tolylene diisocyanate, xylene diisocyanate, hexamethylene diisocyanate, 2,4-diphenylmethane diisocyanate, 4,4-diphenylmethane diisocyanate, isophorone diisocyanate, tetramethylxylene diisocyanate, naphthalene diisocyanate, etc.

The epoxy compound may include ethylene glycol diglycidyl ether, triglycidyl ether, trimethylolpropane triglycidyl ether, N,N,N',N'-tetraglycidyl diamine, glycerine diglycidyl ether, 1,3-bis(N,N-diglycidylaminomethyl)cyclohexane, etc.

The melamine-based resin may include hexamethylol melamine.

The aziridine-based compound may include N,N'-toluene-2,4-bis(1-aziridine carboxamide), N,N'-diphenylmethane-4,4'-bis(1-aziridine carboxamide), triethylenemelamine, bisisophthaloyl-1-(2-methylaziridine), tri-1-aziridinylphosphine oxide, etc.

The cross-linking agent may be included at a content of 0.01 to 17 parts by weight, based on 100 parts by weight of the acrylic copolymer (based on the solid content). When the content of the cross-linking agent is less than 0.01 part by weight, sticking strength or cohesion of the sticking agent is not sufficient, whereas a surface migration may occur due to a decrease in compatibility and adhesive strength may be degraded due to an excessive cross-linking reaction when the content of the cross-linking agent exceeds 17 parts by weight.

The silane coupling agent serves to enhance an sticking strength upon bonding to a liquid crystal cell or a base, and thus may include known silane coupling agents. For example, 3-glycidoxypropyltrimethoxysilane may be preferably used as the silane coupling agent containing an epoxy group. The epoxy group of the silane coupling agent binds to a cross-linkable functional group of the acrylic copolymer, an alkoxysilane moiety strongly binds to a glass substrate of the liquid crystal cell to improve adhesive stability, thereby improving heat resistance and wet-heat resistance characteristics. In particular, the epoxy group serves to aid in improving sticking durability when the polarizing plate is kept for a long period of time under high temperature or humidity conditions.

The silane coupling agent may be included at a content of 0.01 to 1 part by weight, based on 100 parts by weight of the acrylic copolymer (based on the solid content). When the content of the silane coupling agent is less than 0.01 part by weight, an sticking strength to a liquid crystal cell may be poor, whereas a reworking property is not good when the content of the silane coupling agent exceeds 1 part by weight.

First, a sticking agent composition having a low storage modulus G1', that is, constituting the first sticking agent layer 11 is used to adjust the weight average molecular weight of a copolymer containing a cross-linkable functional group, that is, an acrylic copolymer. Specifically, a low molecular weight copolymer having a weight average molecular weight of 50,000 or more to less than 500,000 may be used alone as the acrylic copolymer having a low storage modulus G1'. Also, when the high molecular weight copolymer (a) having a weight average molecular weight of 500,000 to 2,000,000, preferably 1,000,000 to 1,500,000 is used, the low molecular weight copolymer (b) having a weight average molecular weight of 50,000 to 500,000, preferably 100,000 to 400,000 may be mixed at a content of 5 to 50 parts by weight, preferably 10 to 40 parts by weight, based on 100 parts by weight of the copolymer (a) (based on the solid content).

Also, the sticking agent composition may further include a plasticizer to reduce the storage modulus G1'. Specific examples of the plasticizer may include an ester such as phthalic acid ester, trimellitic acid ester, pyromellitic acid ester, adipic acid ester, sebacic acid ester, glycol ester, etc., a process oil, a liquid resin such as liquid polyether, etc., which may be used alone or in a combination of two or more. The plasticizer may be included at a content of 0.1 to 50 parts by weight, preferably 1 to 30 parts by weight, based on 100 parts by weight of the acrylic copolymer (based on the solid content), but the present invention is not particularly limited thereto.

Next, in the case of a sticking agent composition having a high storage modulus G2', that is, constituting the second sticking agent layer 15, at least one selected from the group consisting of a UV-curable compound, a cellulose resin, and fine particles is added to the acrylic copolymer having a weight average molecular weight of 1,000,000 to 1,500,000 so as to achieve the high storage modulus G2'.

A multifunctional (meth)acrylate-based monomer having a weight average molecular weight of less than 1,000 may be used as the UV-curable compound. Specific examples of the UV-curable compound may include a bifunctional monomer such as 1,4-butanediol di(meth)acrylate, 1,6-hexanediol di(meth)acrylate, neopentylglycol di(meth)acrylate, polyethylene glycol di(meth)acrylate, dicyclopentanyl di(meth)acrylate, caprolactone-modified dicyclopentenyl di(meth)acrylate, ethyleneoxide-modified phosphoric acid di(meth)acrylate, di(acryloxyethyl)isocyanurate, allylated cyclohexyl di(meth)acrylate, dimethylol dicyclopentane diacrylate, ethyleneoxide-modified hexahydrophthalic acid diacrylate, tricyclodecane dimethanolacrylate, neopentylglycol-modified trimethylolpropane diacrylate, and adamantane diacrylate; a trifunctional monomer such as trimethylolpropane tri(meth)acrylate, dipentaerythritol tri(meth)acrylate, propionic acid-modified dipentaerythritol tri(meth)acrylate, pentaerythritol tri(meth)acrylate, propyleneoxide-modified trimethylolpropane tri(meth)acrylate, and tris(acryloxyethyl)isocyanurate; a tetrafunctional monomer such as diglycerin tetra(meth)acrylate and pentaerythritol tetra(meth)acrylate; a pentafunctional monomer such as propionic acid-modified dipentaerythritol penta(meth)acrylate; and a hexafunctional monomer such as caprolactone-modified dipentaerythritol hexa(meth)acrylate. Also, a UV-curable oligomer having a weight average molecular weight of 50,000 or less may be used as the UV-curable compound. For example, the UV-curable compound may include polyester acrylate-based, epoxy acrylate-based, urethane acrylate-based, polyether acrylate-based, polybutadiene acrylate-based, silicon acrylate-based oligomers, etc., which may be used alone or in a combination of two or more.

The UV-curable compound may be included at a content of 1 to 100 parts by weight, based on 100 parts by weight of the acrylic copolymer (based on the solid content).

The UV-curable compound may be used together with a photoinitiator that generates radicals or cations by radiating UV rays.

Specific examples of the photoinitiator may include benzoin, benzoin methyl ether, benzoin ethyl ether, benzoin isopropyl ether, benzoin-n-butyl ether, benzoin isobutyl ether, acetophenone, dimethylamino acetophenone, 2,2-dimethoxy-2-phenylacetophenone, 2,2-diethoxy-2-phenylacetophenone, 2-hydroxy-2-methyl-1-phenylpropane-1-one, 1-hydroxycyclohexyl phenyl ketone, 2-methyl-1-[4-(methylthio)phenyl]-2-morpholino-propane-1-one, 4-(2-hydroxyethoxy)phenyl-2-(hydroxy-2-propyl)ketone, benzophenone, p-phenylbenzophenone, 4,4'-diethylaminobenzophenone, dichlorobenzophenone, 2-methylanthraquinone, 2-ethylanthraquinone, 2-t-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyldimethylketal, acetophenone dimethylketal, p-dimethylaminobenzoic acid ester, 2,4,6-trimethylbenzoyl-diphenyl-phosphine oxide, etc., which may be used alone or in a combination of two or more.

The photoinitiator may be generally included at a content of 0.2 to 20 parts by weight, based on 100 parts by weight of the UV-curable compound (based on the solid content).

The cellulose resin is a resin that reacts with a functional group of the cross-linking agent to give a high storage modulus, and may have a weight average molecular weight of 10,000 to 100,000 and a content of hydroxyl group ranging from 3 to 20% by weight. Specific examples of the cellulose resin may include cellulose acetate (CA), cellulose acetate butyrate (CAB), cellulose acetate propionate (CAP), carboxymethyl cellulose (CMC), cellulose nitrate (CN), cellulose propionate (CP), ethyl cellulose (EC), carboxymethyl cellulose acetate butyrate (CMCAB), etc., which may be used alone or in a combination of two or more.

The cellulose resin may be included at a content of 10 to 70 parts by weight, based on 100 parts by weight of the acrylic copolymer (based on the solid content), preferably a content of 10 to 65 parts by weight, and more preferably 10 to 60 parts by weight in consideration of compatibility with the other components included in the sticking agent composition.

The fine particles have the same refractive index as that of the acrylic copolymer, and organic particles, inorganic particles or organic-inorganic complex particles may be used. The organic particles include particles of an acrylic resin such as a polymethylmethacrylate resin, a polystyrene resin, a styrene-acryl copolymer resin, a polyethylene resin, an epoxy resin, etc., and the inorganic particles may include particles of silica, potassium carbonate, aluminum hydroxide, magnesium hydroxide, titanium dioxide, etc. Also, the organic-inorganic complex particles may include particles having a core-shell structure in which surfaces of the inorganic particles such as silica are modified. Among these, the organic particles and the organic-inorganic complex particles have excellent dispersibility for the acrylic copolymer, and thus are preferred, and the organic-inorganic complex particles in which surfaces of polymethylmethacrylate particles and silica particles are modified are more preferred.

The fine particles may be included at a content of 10 to 70 parts by weight, preferably 10 to 60 parts by weight, based on 100 parts by weight of the acrylic copolymer (based on the solid content).

The thicknesses of the first and second sticking agent layers 11 and 15 may be adjusted according to the sticking strength thereof, and may be generally in a range of 3 to 100 μm. Preferably, the thickness of the first sticking agent layer 11 may be in a range of 10 to 50 more preferably 15 to 25 μm, and the thickness of the second sticking agent layer 15 may be in a range of 5 to 30 μm, more preferably 10 to 15 μm.

A method of stacking such first and second sticking agent layers 11 and 15 is not particularly limited as long as the method is generally used in the related art. For example, the first or second sticking agent layer 11 or 15 (or a sticking sheet) is formed using a flow casting method, or a coating method such as a bar coater, air knife, gravure, reverse roll, kiss roll, spray, or blade method, for example, by directly applying an adhesive composition on a release film or a release film on which a silicone release coating layer is formed using a proper spreading method, followed by drying and curing the adhesive composition. The formed first and second sticking agent layers 11 and 15 are stacked on both surfaces of the λ/4 retardation film 13.

The polarizing plate 100 including the configuration as described above may have a structure in which various optical layers satisfying the desired optical characteristics are stacked on the polarizer.

For example, the polarizing plate 100 may have a structure in which a protective film for protecting a polarizer is stacked on at least one surface of the polarizer; a structure in which a surface-treated layer such as a hard coating layer, an anti-reflection layer, an anti-sticking layer, a diffusion barrier layer, or an anti-glare layer is stacked on at least one surface of a polarizer or a protective film; a structure in which another functional film is stacked on at least one surface of a polarizer or a protective film, etc.

Also, the polarizing plate 100 may have a structure in which at least one of an optical film, a reflector, a transflector, a viewing angle compensation film, and a brightness enhancement film, which are used in a polarization conversion device used to form various display devices, is stacked as an optical layer. More specifically, a reflective or transflective polarizing plate in which a reflector or transflective reflector is stacked on the stacked protective film; an oval or circular polarizing plate on which a retardation plate is stacked; a wide viewing angle polarizing plate on which a viewing angle compensation layer or a viewing angle compensation film is stacked; or a polarizing plate on which a brightness enhancement film is stacked is preferably used as the polarizing plate having a structure in which the protective film is stacked on one surface of the polarizer.

As described above, the polarizing plate including the second sticking agent layer, the λ/4 retardation film, the first sticking agent layer, and the polarizing film, which are sequentially stacked from a lower portion thereof may be prepared by adjusting the storage moduli of the first and second sticking agent layers to prepare a polarizing plate that is thin in thickness while exhibiting high reliability and high durability since the polarizing plate has almost no change in retardation value even under high temperature/humidity conditions.

Referring to Experimental Example 1 of the present invention, the polarizing plate exhibited excellent results from the measurement of durability and wet-heat resistance, and had a change in retardation value of less than 3% even when kept at 80° C. for 500 hours. From the results, it can be seen that a thin polarizing plate having excellent reliability may be prepared.

Such a polarizing plate is used in various display devices, for example, LCDs or OLEDs to realize high-quality screens.

EXEMPLIFICATION

Hereinafter, preferred exemplary embodiments of the present invention will be described in order to aid in understanding the present invention. However, it should be understood that the description proposed herein is just a preferable example for the purpose of illustrations only, not intended to limit or define the scope of the invention. Therefore, it will be apparent to those skilled in the art that various changes and modifications can be made to the exemplary embodiments of the present invention without departing from the scope of the present invention, so it should be understood that the present invention covers all such changes and modifications provided they are within the scope of the appended claims and their equivalents.

Preparative Example 1: Preparation of Acrylic Copolymer

A 4-neck jacket reactor (1 L) was equipped with an agitator, a thermometer, a reflux condenser, a dropping lot, and a nitrogen gas inlet pipe, and nitrogen gas was added to the reactor so that the reactor was purged with nitrogen gas. Thereafter, 120 parts by weight of ethyl acetate, 98.1 parts by weight of n-butyl acrylate, 0.5 part by weight of acrylic acid, and 1.4 parts by weight of 2-hydroxyethyl acrylate were added thereto, and the external temperature of the reactor was warmed to 50° C. Subsequently, a solution obtained by thoroughly dissolving 0.1 part by weight of 2,2'-azobisisobutyronitrile (AIBN) in 10 parts by weight of ethyl acetate was added dropwise in the reactor. The resulting mixture was reacted for another 5 hours while maintaining the external temperature of a jacket at 50° C., and 90 parts by weight of ethyl acetate was then added dropwise through the dropping lot for an hour. Also, the resulting mixture was reacted for another 5 hours while maintaining an external temperature of the jacket at 50° C. Then, when the reaction was completed, the mixture was diluted with ethyl acetate to obtain an acrylic copolymer A solution having a solid content of 20%. The prepared acrylic copolymer has a weight average molecular weight (converted with respect to polystyrene) of approximately 1,500,000, as measured by a GPC method.

Preparative Example 2: Preparation of a Soft-Type Sticking Agent Layer (G'=4.78×10$^5$ Pa)

Preparation of Sticking Agent Composition 100 parts by weight of the acrylic copolymer (based on the solid content) prepared in Preparative Example 1, 0.8 part by weight of a cross-linking agent, trimethylolpropane-modified tolylene diisocyanate (trade name: Coronate L, commercially available from Nippon Polyurethane Industry), and 0.15 part by weight of a silane coupling agent, 3-glycidoxypropyltrimethoxysilane (trade name: KBM-403, commercially available from ShinEtsu Chemical Co., Ltd.) were mixed, and diluted to a proper concentration using ethyl acetate as a solvent, thereby preparing a sticking agent composition.

(2) Measurement of Storage Modulus

The storage modulus G' of the sticking agent composition prepared in (1) was measured under the following conditions. As a result, it was revealed that the sticking agent composition prepared in Preparative Example 2 had a storage modulus of $4.78 \times 10^5$ Pa.

<Measurement of Storage Modulus>

A sticking sheet (the thickness of a sticking agent layer: 25 μm) of the polarizing plate was prepared into cylindrical specimens having a diameter of 25 mm and a thickness of 1 mm, and measured using a torsional shear method.

Measuring machine: Dynamic viscoelastic measurement system (MCR300, commercially available from PSICA)
Frequency: 1 Hz
Measured temperature: 23° C.

(3) Preparation of a Soft-Type Sticking Agent Layer

The prepared sticking agent composition was applied onto a plurality of PET release films (heavy-duty films) (25 cm×20 cm) coated with a release agent using an applicator, and then dried so that the sticking agent had a thickness of 10 to 15 The resulting PET release films with the sticking agent were then dried at 100° C. for 3 minutes in a forced circulation hot air dryer of an oven to prepare a sticking sheet. Thereafter, another release film (a light-duty film) was stacked on the sticking agent layer of the sticking sheet to prepare a soft-type sticking agent layer having the storage modulus in the form of a non-carrier film (NCF).

Preparative Example 3: Preparation of a Hard-Type Sticking Agent Layer (G'=$1.35 \times 10^6$ Pa)

15 parts by weight of tris(acryloxyethyl) isocyanurate (molecular weight: 423, trifunctional, aronix M-315), 1.5 parts by weight of 1-hydroxycyclohexyl phenyl ketone as a photoinitiator, 1.5 parts by weight of trimethylol-modified tolylene diisocyanate as a cross-linking agent, 0.12 part by weight of a silane-based coupling agent, and 1.5 parts by weight of 1,4-butanediol as an adhesion stabilizer, were mixed based on 100 parts by weight of the prepared acrylic resin to prepare a sticking agent composition.

The prepared sticking agent composition was coated onto a PET release film (MRF-38 commercially available from Mitsubishi Chemical Corp.) having a thickness of 38 μm as a release sheet, and then dried so that the sticking agent had a thickness of 25 μm. The resulting PET release film with the sticking agent was then dried at 110° C. for 3 minutes in an oven. Thereafter, the dried coating layer was stored for approximately 24 hours in a constant temperature and humidity room (23° C., and 55% RH), and the sticking agent layer was then laminated to a WV coating layer of a polarizing plate having a wide-view (WV) liquid crystal layer coated on one surface thereof. Subsequently, the sticking agent layer was irradiated with UV rays under the following conditions to prepare a hard-type sticking agent layer having the storage modulus.

Preparative Example 4: Preparation of a Soft-Type Sticking Agent Layer (G1'=$6.62 \times 10^5$ Pa)

A soft-type sticking agent layer having the storage modulus was prepared in the same manner as in Preparative Example 2, except that tolylene diisocyanate was used in an amount of 0.95 part by weight.

Preparative Example 5: Preparation of a Soft-Type Sticking Agent Layer (G1'=$6.96 \times 10^5$ Pa)

A soft-type sticking agent layer having the storage modulus was prepared in the same manner as in Preparative Example 2, except that tolylene diisocyanate was used in an amount of 1.0 part by weight.

Preparative Example 6: Preparation of a Hard-Type Sticking Agent Layer (G'=$1.14 \times 10^6$ Pa)

A hard-type sticking agent layer having the storage modulus was prepared in the same manner as in Preparative Example 3, except that tolylene diisocyanate was used in an amount of 1.3 parts by weight.

Preparative Example 7: Preparation of a Hard-Type Sticking Agent Layer (G'=$1.41 \times 10^6$ Pa)

A hard-type sticking agent layer having the storage modulus was prepared in the same manner as in Preparative Example 3, except that tolylene diisocyanate was used in an amount of 1.55 parts by weight.

Example 1: Preparation of a Polarizing Plate

Preparation of a Polarizing Film

A polyvinyl alcohol film (VF-PS, commercially available from Kuraray Co. Ltd.) having a thickness of 75 μm, an average degree of polymerization of 2,400 and a degree of saponification of 99.9 mole % or more was uniaxially stretched 6 times using a dry process, immersed in water (deionized water) at 60° C. for one minute while being maintained in the state of tension, and then immersed in an aqueous solution at 28° C. for 60 seconds in which the weight ratio of iodine, potassium iodide and water was 0.013:5:100. Thereafter, the polyvinyl alcohol film was immersed in an aqueous solution at 55° C. for 300 seconds in which the weight ratio of potassium iodide, boric acid and water was 13:10:100. Then, the polyvinyl alcohol film was washed with water at 10° C. for 5 seconds, and then dried at 45° C. for 4 minutes to prepare a polarizer in which iodine was adsorptively aligned in a polyvinyl alcohol resin.

A triacetyl cellulose (TAC) film having a thickness of 40 μm was attached to one surface of the polarizer with a thickness of 25 μm in which iodine was adsorptively aligned in the polyvinyl alcohol-based resin film using an adhesive including a polyvinyl alcohol and a water-soluble epoxy resin.

(2) Preparation of a λ/4 Retardation Film 9.1% by weight of a compound of Formula 1-1 disclosed in Japanese Patent Laid-Open Publication No. 2010-024438, a liquid crystal compound (LC242), 0.9% by weight of a photoinitiator (IRGACURE 907, commercially available from Ciba Specialty Chemicals), 0.1% by weight of a leveling agent (BYK-361N, commercially available from BIGCHEMI JAPAN), and 69.0% by weight of cyclopentanone were mixed to prepare a liquid crystal coating composition.

A PET film was rubbed, and the liquid crystal coating composition was then applied to one rubbed surface of the PET film using a spin coating method, and then dried at 130° C. for one minute. Then, the PET film with the liquid crystal coating composition was heated to 80° C. while being irradiated with 1200 mJ/cm² UV rays, thereby preparing a retardation film.

(3) Preparation of a Polarizing Plate

The soft-type sticking agent film (G1'=$4.78 \times 10^5$ Pa) of Preparative Example 2 was used as the first sticking agent, and the hard-type sticking agent film (G2'=$1.35 \times 10^6$ Pa) of Preparative Example 3 was used as the second sticking agent.

First, the polarizing plate prepared in (1) was subjected to corona treatment (approximately 10 kV) using a corona treating machine to enhance an adhesion between the second sticking agent and a film. In this case, the corona-treated polarizing plate and the second sticking agent film were bonded to each other using laminating equipment.

Next, the surface of the polarizing plate on which the second sticking agent film was formed, and the coating surface of the λ/4 retardation film were subjected to corona treatment as described above, and then bonded to each other using laminating equipment. Then, the alignment film and the PET film were removed to leave only a coated retardation film.

Then, the surface of the λ/4 retardation film prepared in (2) and the first sticking agent film were bonded to each other using laminating equipment to prepare a polarizing plate. The prepared polarizing plate was bonded to a glass having a size of 40 mm×40 mm and a thickness of 0.1 T (N=5). Thereafter, the prepared specimen was placed in an autoclave for 20 minutes under conditions of 5 atm. and 50° C. to remove bubbles between the bonded layers.

Example 2: Preparation of a Polarizing Plate

A polarizing plate was prepared in the same manner as in Example 1, except that the soft-type sticking agent layer having a storage modulus G1' of $6.62\times10^5$ Pa prepared in Preparative Example 4 was used as the first sticking agent layer.

Example 3: Preparation of A Polarizing Plate

A polarizing plate was prepared in the same manner as in Example 1, except that the soft-type sticking agent layer having a storage modulus G1' of $6.96\times10^5$ Pa of Preparative Example 5 was used as the first sticking agent layer.

Comparative Example 1: Preparation of a Polarizing Plate

A polarizing plate was prepared in the same manner as in Example 1, except that the hard-type sticking agent layer having a storage modulus G1' of $1.14\times10^6$ Pa of Preparative Example 6 was used as the first sticking agent layer.

Comparative Example 2: Preparation of a Polarizing Plate

A polarizing plate was prepared in the same manner as in Example 1, except that the hard-type sticking agent layer having a storage modulus G1' of $1.35\times10^6$ Pa of Preparative Example 3 was used as the first sticking agent layer.

Comparative Example 3: Preparation of a Polarizing Plate

A polarizing plate was prepared in the same manner as in Example 1, except that the hard-type sticking agent layer having a storage modulus G1' of $1.41\times10^6$ Pa of Preparative Example 7 was used as the first sticking agent layer.

Experimental Example 1: Measurement and analysis of physical properties

Heat-Resistance Test

Each of the polarizing plates prepared in Examples and Comparative Examples was cut into pieces having a size of 17 cm×17 cm, and bonded to a #1937 glass (Corning Co., Ltd.) to prepare specimens.

The prepared specimens were placed in an autoclave for 20 minutes under conditions of 5 atm. and 50° C., and kept at 80° C. for 300 hours in an oven. The resulting specimens were evaluated with naked eyes whether peeling (i.e., delamination and peel-off) and bubble generation occurred on the appearance of each of the specimens, and was evaluated according to the following evaluation criteria. In this case, the evaluation results encompass both the peeling and the bubble generation occurring between the polarizer and the sticking agent layer, and between the sticking agent layer and the glass.

<Evaluation Criteria for Heat Resistance>

◉: No bubbles and peels are generated (very good).

○: Few bubbles and peels are generated (good).

Δ: Bubbles and peels are somewhat generated (mean)

x: Bubbles and peels are highly generated (poor).

(2) Wet-Heat-Resistance Test

Each of the polarizing plates prepared in Examples and Comparative Examples was cut into specimens having a size of 180 mm×130 mm (width×length), and the specimens were attached to a glass substrate (a soda lime glass) to prepare samples.

Next, the prepared samples was dipped into water at a temperature of 60° C., kept for 24 hours, and then taken out to observe whether bubbles or peels were generated. Then, the water resistance was evaluated according to the following evaluation criteria. The prepared samples were kept at room temperature for 24 hours immediately before measurement of the water resistance, and then evaluated. The evaluation conditions are as follows.

<Evaluation Criteria for Wet-Heat Resistance>

○: No bubbles and peels are generated at the interface between the adhesive layer and the sticking agent layer or the interface between the polarizer and the sticking agent layer Δ: Bubbles and/or peels are slightly generated at the interface between the adhesive layer and the sticking agent layer or the interface between the polarizer and the sticking agent layer x: Bubbles and/or peels are highly generated at the interface between the adhesive layer and the sticking agent layer or the interface between the polarizer and the sticking agent layer (3) Measurement of Front Retardation Value $R_0$ Heat-resistance and wet-heat-resistance tests were performed to check a change in front retardation value after the tests, as follows.

The polarizing plates prepared in Examples and Comparative Examples were bonded to glasses having a width of 40 mm, a length of 40 mm and a height of 1.1 mm.

<Heat Resistance Condition>

The polarizing plates were measured for initial $R_0$ values using KOBRA, and then kept at 85° C. for 500 hours in an oven. Thereafter, the polarizing plates were cooled to room temperature, and then measured again for $R_0'$ (front retardation values) using KOBRA. The decrease rates in front retardation values (%) were calculated according to the following Equation 3. The results are listed in Table 1. In this case, the thickness-direction retardation value $R_{th}$ was 69.15±0.8 nm.

Decrease rate in front retardation value (%) = [Equation 3]

$$\frac{R_0 - R_0'}{R_0} \times 100$$

In Equation 3, $R_0$ represents an initial front retardation value, and $R_0'$ represents a front retardation value after a heat resistance test.

<Wet-Heat Resistance Condition>

The polarizing plates were measured for initial $R_0$ values using KOBRA, and then kept for 500 hours under conditions of a temperature of 60° C. and 90% relative humidity. Thereafter, the polarizing plates were cooled to room temperature, and then measured again for $R_0''$ values using KOBRA. The decrease rates in front retardation values (%) were calculated according to the following Equation 4. The results are listed in Table 1. In this case, the thickness-direction retardation value $R_{th}$ was 69.15±0.8 nm.

Decrease rate in front retardation value (%) = [Equation 4]

$$\frac{R_0 - R_0''}{R_0} \times 100$$

In Equation 4, $R_0$ represents an initial front retardation value, and $R_0''$ represents a front retardation value after a wet-heat resistance test.

TABLE 1

| Items | Heat resistance | Wet-heat resistance | Initial $R_0$ (nm) | $R_0$ (nm) after heat resistance test | $R_0$ (nm) after wet-heat resistance test | Decrease rate in front retardation value $R_0$ (%) After heat resistance test | After wet-heat resistance test |
|---|---|---|---|---|---|---|---|
| Example 1 | ⊚ | ○ | 142.8 | 139.4 | 139.9 | 2.38 | 2.03 |
| Example 2 | ⊚ | ○ | 142.9 | 139.3 | 139.7 | 2.52 | 2.24 |
| Example 3 | ⊚ | ○ | 143.1 | 138.9 | 139.3 | 2.94 | 2.66 |
| Comparative Example 1 | X | X | 143.0 | 136.5 | 136.8 | 4.55 | 4.48 |
| Comparative Example 2 | Δ | Δ | 143.3 | 136.9 | 137.2 | 4.47 | 4.33 |
| Comparative Example 3 | Δ | Δ | 142.9 | 137.7 | 137.8 | 3.64 | 3.57 |

Referring to Table 1, the polarizing plates according to one exemplary embodiment of the present invention in which the first and second sticking agent layers had controlled storage moduli exhibited excellent heat resistance and wet-heat resistance, and particularly a decrease rate in front retardation value of less than 3%.

In comparison, it was revealed that the polarizing plates in the case of Comparative Examples 1 to 3 in which the hard-type sticking agent layers were used as upper and lower sticking agent layers exhibited poor heat resistance and wet-heat resistance characteristics and had a decrease rate in front retardation value differing by approximately 1.8 or more From the results, it could be seen that the polarizing plate according to one exemplary embodiment of the present invention to which the λ/4 retardation film for liquid crystal coating was applied had a small change in the front retardation value $R_0$ even under the conditions for measurement of heat resistance and wet-heat resistance, making it possible to prepare highly durable polarizing plates.

INDUSTRIAL APPLICABILITY

The polarizing plate according to one exemplary embodiment of the present invention is a highly durable polarizing plate and a thin polarizing plate, and thus can be attached to various display devices such as LCDs or OLEDs to realize high-quality screens.

For the polarizing plate according to one exemplary embodiment of the present invention, since the λ/4 retardation film coated with liquid crystals is applied to the polarizing plate, the polarizing plate having a small change in retardation value under reliability evaluation environments for heat resistance, wet-heat resistance, and H/S can be prepared.

Such a polarizing plate is a thin polarizing plate, and thus can be attached to LCDs or OLEDs to realize high-quality screens.

It will be apparent to those skilled in the art that various modifications can be made to the above-described exemplary embodiments of the present invention without departing from the scope of the invention. Thus, it is intended that the present invention covers all such modifications provided they come within the scope of the appended claims and their equivalents.

DESCRIPTION OF REFERENCE NUMERALS

100: Polarizing Plate
11: First sticking agent layer
13: λ/4 retardation film
15: Second sticking agent layer
17: polarizing film

The invention claimed is:

1. A polarizing plate comprising a first sticking agent layer, a λ/4 retardation film, a second sticking agent layer, and a polarizing film, which are stacked from a lower portion of the polarizing plate;
wherein the first sticking agent layer and the λ/4 retardation film are bonded to each other, the λ/4 retardation film and the second sticking agent layer are bonded to each other, the first sticking agent layer has a storage modulus G1' of $3.5 \times 10^5$ to $7.0 \times 10^5$ Pa, and the second sticking agent layer has a storage modulus G2' of $1.1 \times 10^6$ to $1.5 \times 10^6$ Pa.

2. The polarizing plate of claim 1, wherein the first sticking agent layer has a storage modulus G1' of $3.5 \times 10^5$ to $6.7 \times 10^5$ Pa, and the second sticking agent layer has a storage modulus G2' of $1.2 \times 10^6$ to $1.4 \times 10^6$ Pa.

3. The polarizing plate of claim 1, wherein each of the first sticking agent layer and the second sticking agent layer has a thickness of 3 to 100 μm.

4. The polarizing plate of claim 1, wherein the first sticking agent layer has a thickness of 10 to 50 and the second sticking agent layer has a thickness of 5 to 30 μm.

5. The polarizing plate of claim 1, wherein the λ/4 retardation film is a λ/4 retardation film having a liquid crystal coating layer formed by coating.

6. The polarizing plate of claim 1, wherein the λ/4 retardation film is an inverse-wavelength dispersible film having a $$\frac{R_o(450\ nm)}{R_o(550\ nm)}$$

value of 0.7 to 0.99 with respect to a front retardation value $R_o$.

7. The polarizing plate of claim 1, wherein the λ/4 retardation film is a flat-wavelength dispersible film having a $$\frac{R_o(450\ nm)}{R_o(550\ nm)}$$

value of 0.99 to 1.01 with respect to a front retardation value $R_o$.

8. The polarizing plate of claim 1, wherein the λ/4 retardation film is a normal-wavelength dispersible film having a $$\frac{R_o(450\ nm)}{R_o(550\ nm)}$$

value of 1.01 to 2 with respect to a front retardation value $R_o$.

9. The polarizing plate of claim 1, wherein the λ/4 retardation film has a thickness-direction retardation value $R_{th}$ of 40 to 180 nm.

10. The polarizing plate of claim 1, wherein the λ/4 retardation film has a front retardation value $R_o$ of 110 to 180 nm.

11. The polarizing plate of claim 1, wherein the polarizing film has a stacked structure comprising a polarizer and a protective film formed on at least one surface of the polarizer.

12. The polarizing plate of claim 1, further comprising a zero retardation film formed to come in contact with at least one layer selected from the group consisting of the first sticking agent layer and the second sticking agent layer.

13. A display device comprising the polarizing plate as defined in claim 1.

* * * * *